United States Patent
Thornton et al.

(10) Patent No.: US 8,588,220 B2
(45) Date of Patent: Nov. 19, 2013

(54) METHOD AND APPARATUS FOR MITIGATING PORT SWAPPING DURING SIGNAL TRACKING

(75) Inventors: Steven D. Thornton, Rockwall, TX (US); John A. Adams, Van Alstyne, TX (US); Brian Holden, Rockwall, TX (US)

(73) Assignee: L-3 Communications Corporation, New York, NY (US)

( * ) Notice: Subject to any disclaimer, the term of this patent is extended or adjusted under 35 U.S.C. 154(b) by 1578 days.

(21) Appl. No.: 11/323,608

(22) Filed: Dec. 30, 2005

(65) Prior Publication Data

US 2007/0153779 A1 Jul. 5, 2007

(51) Int. Cl.
*H04L 12/50* (2006.01)
*H04B 7/212* (2006.01)
*H04W 24/00* (2009.01)

(52) U.S. Cl.
USPC ........... 370/359; 370/342; 370/344; 370/430; 370/442; 455/456.1; 455/456.5; 455/456.6

(58) Field of Classification Search
USPC ............... 370/335, 342, 449; 455/277.1, 12.1
See application file for complete search history.

(56) References Cited

U.S. PATENT DOCUMENTS

| | | | | |
|---|---|---|---|---|
| 3,987,444 A | * | 10/1976 | Masak et al. | 342/380 |
| 4,641,144 A | * | 2/1987 | Prickett | 343/754 |
| 4,845,506 A | * | 7/1989 | Shibata et al. | 343/713 |
| 5,227,803 A | | 7/1993 | O'Connor | |
| 5,361,258 A | * | 11/1994 | Arnold et al. | 370/330 |
| 5,381,150 A | | 1/1995 | Hawkins | |
| 5,412,658 A | * | 5/1995 | Arnold et al. | 370/330 |
| 5,507,035 A | * | 4/1996 | Bantz et al. | 455/133 |
| 5,714,964 A | * | 2/1998 | Jackson | 343/786 |
| 6,100,845 A | | 8/2000 | Rose | |
| 6,163,297 A | | 12/2000 | Rose | |
| 6,229,486 B1 | * | 5/2001 | Krile | 343/700 MS |
| 6,252,865 B1 | * | 6/2001 | Walton et al. | 370/335 |
| 6,252,867 B1 | * | 6/2001 | Pfeil et al. | 370/335 |
| 6,313,794 B1 | * | 11/2001 | Rose | 342/424 |
| 6,421,010 B1 | | 7/2002 | Chadwick | |
| 6,421,781 B1 | * | 7/2002 | Fox et al. | 726/4 |
| 6,456,257 B1 | * | 9/2002 | Zamat | 343/876 |
| 6,556,173 B1 | * | 4/2003 | Moustakas et al. | 343/725 |
| 6,642,887 B2 | * | 11/2003 | Owechko | 342/373 |
| 6,646,604 B2 | * | 11/2003 | Anderson | 342/465 |
| 6,721,411 B2 | * | 4/2004 | O'Malley et al. | 379/202.01 |
| 6,876,859 B2 | * | 4/2005 | Anderson et al. | 455/456.1 |
| 6,959,126 B1 | * | 10/2005 | Lofland et al. | 385/16 |
| 6,992,621 B2 | * | 1/2006 | Casas et al. | 342/373 |
| 6,993,440 B2 | * | 1/2006 | Anderson et al. | 702/66 |
| 7,210,164 B1 | * | 4/2007 | Jandrell | 726/2 |

(Continued)

FOREIGN PATENT DOCUMENTS

EP 1251709 A2 * 10/2002 ............... H04Q 7/38

*Primary Examiner* — Marsha D Banks Harold
*Assistant Examiner* — Christopher Wyllie
(74) *Attorney, Agent, or Firm* — Hovey Williams LLP (57) ABSTRACT

Embodiments of the present invention provide a method and apparatus for mitigating port swapping during signal tracking. The method and apparatus generally include acquiring a first signal characteristic corresponding to a signal assigned to a first port, comparing the first signal characteristic to a second previously acquired signal characteristic, and assigning the signal to a second port if the first and second signal characteristics vary. Such a configuration mitigates port swapping without requiring signals to include identification information, thereby enabling assignment of signals corresponding to any format or source.

19 Claims, 3 Drawing Sheets

(56) References Cited

U.S. PATENT DOCUMENTS

| | | | |
|---|---|---|---|
| 7,286,930 B2 * | 10/2007 | Brass et al. | 701/439 |
| 7,356,343 B2 * | 4/2008 | Feher | 455/456.1 |
| 7,414,582 B1 * | 8/2008 | Thornton et al. | 342/423 |
| 7,433,371 B2 * | 10/2008 | Atsumi et al. | 370/498 |
| 7,764,224 B1 * | 7/2010 | Anderson | 342/357.27 |
| 7,885,688 B2 * | 2/2011 | Thornton et al. | 455/562.1 |
| 2003/0114169 A1 * | 6/2003 | Okamura et al. | 455/456 |
| 2004/0027279 A1 * | 2/2004 | Jacomb-Hood | 342/368 |
| 2004/0032363 A1 * | 2/2004 | Schantz et al. | 342/127 |
| 2004/0208238 A1 * | 10/2004 | Thomas et al. | 375/148 |
| 2004/0255172 A1 * | 12/2004 | Dayan et al. | 713/300 |
| 2005/0030160 A1 * | 2/2005 | Goren et al. | 340/10.5 |
| 2005/0030929 A1 * | 2/2005 | Swier et al. | 370/338 |
| 2005/0035857 A1 * | 2/2005 | Zhang et al. | 340/539.13 |
| 2005/0282540 A1 * | 12/2005 | Motamedi et al. | 455/423 |
| 2006/0093055 A1 * | 5/2006 | Goldberg | 375/267 |
| 2006/0116130 A1 * | 6/2006 | Kennedy, Jr. et al. | 455/456.1 |
| 2006/0142998 A1 * | 6/2006 | Tseng et al. | 704/201 |
| 2006/0181430 A1 * | 8/2006 | Choi et al. | 340/825.72 |
| 2007/0030116 A1 * | 2/2007 | Feher | 340/5.53 |
| 2007/0105495 A1 * | 5/2007 | Knight | 455/12.1 |
| 2007/0153779 A1 * | 7/2007 | Thornton et al. | 370/359 |
| 2007/0174403 A1 * | 7/2007 | Barry | 709/207 |
| 2008/0055175 A1 * | 3/2008 | Rebeiz et al. | 343/754 |
| 2008/0062856 A1 * | 3/2008 | Feher | 370/206 |
| 2008/0102764 A1 * | 5/2008 | Thornton et al. | 455/84 |
| 2009/0015479 A1 * | 1/2009 | Thornton et al. | 342/417 |
| 2009/0219213 A1 * | 9/2009 | Lee et al. | 343/700 MS |
| 2009/0247187 A1 * | 10/2009 | Feher | 455/456.1 |
| 2012/0140757 A1 * | 6/2012 | Feher | 370/342 |

* cited by examiner

METHOD AND APPARATUS FOR MITIGATING PORT SWAPPING DURING SIGNAL TRACKING

BACKGROUND OF THE INVENTION

1. Field of the Invention

The present invention relates to signal tracking. More particularly, the invention relates to a method and apparatus for mitigating port swapping during signal tracking that utilizes a signal measurement to facilitate assignment of signals to consistent ports.

2. Description of the Related Art

Communication devices are often required to receive one or more wireless signals and assign the received signals to one or more ports for utilization by an operator or other device. For example, a cellular telephone network may include a collector element, such as an antenna, that receives a plurality of signals emitted from a plurality of cellular phones. The collector element is required to identify each signal and assign each signal to a port, such as a data path, computer-readable medium, or electrical connection, for propagation through the network. Similarly, radio systems are often required to receive a plurality of signals from a plurality of radios and assign each signal to a port for listening by an operator.

Due to the ever-increasing number of wireless communication devices, the limited and finite radio-frequency spectrum available for use, and various efficiency and security concerns, signals are often transmitted on the same frequency utilizing CDMA, TDMA, FDMA, etc, thereby further increasing the number and complexity of received signals.

Unfortunately, systems often assign signals to incorrect ports due to the substantial number of signals that must be received and the difficulty in identifying which signals should correspond to particular ports. Collector element and/or wireless communication device movement or and other dynamic signal characteristics further complicate the assignment of signals to ports.

To attempt to overcome these problems, systems often require communication devices to transmit identification information within or in combination with transmitted signals. Although transmitting identification information enables signals to be identified and assigned to correct ports, it increases the complexity of transmitting devices, requires transmitting devices to be compatible with the communications network by transmitting identification information in the correct format, and increases system complexity by requiring the system to continuously parse identification information from each signal. Thus, communications systems often remain inhibited by undesirable port swapping.

SUMMARY OF THE INVENTION

The present invention solves the above-described problems and provides a distinct advance in the art of signal tracking. More particularly, the invention provides a method and apparatus for mitigating port swapping during signal tracking that utilizes a signal measurement to facilitate assignment of signals to consistent ports. Such a configuration mitigates port swapping without requiring signals to include identification information, thereby enabling assignment of signals corresponding to any format or source.

One embodiment of the present invention provides a method of mitigating port swapping during signal tracking. The method generally includes acquiring a first signal characteristic corresponding to a signal assigned to a first port, comparing the first signal characteristic to a second signal characteristic, and assigning the signal to a second port if the first and second signal characteristics vary.

Another embodiment of the present invention provides a computing element operable to mitigate port swapping during signal tracking. The computing element generally includes a first and second port, a memory, and a processor coupled with the ports and the memory. The memory is operable to store a signal characteristic corresponding to a signal assigned to the first port. The processor is operable to acquire another signal characteristic corresponding to the signal, compare both signal characteristics, and assign the signal to the second port if the if the first and second signal characteristics vary.

Another embodiment of the present invention provides a computer program for mitigating port swapping during signal tracking. The computer program is stored on a computer-readable medium for operating a computing element. The computer program generally includes a code segment operable to acquire a first signal characteristic corresponding to a signal assigned to a first port, a code segment operable to compare the first signal characteristic to a second previously acquired signal characteristic, and a code segment operable to assign the signal to a second port if the first and second signal characteristics vary.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
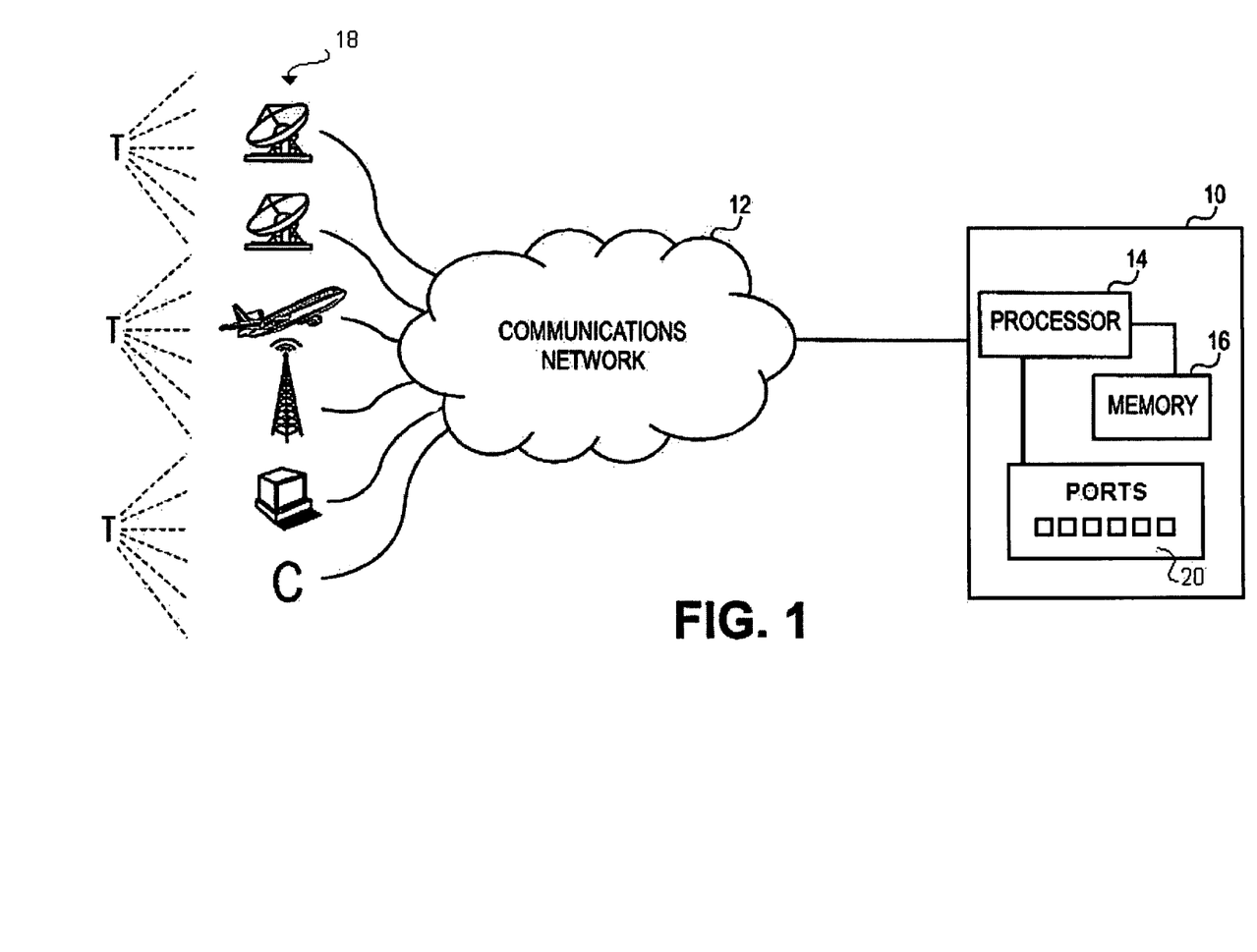
FIG. 1 is a block diagram of some of the elements operable to be utilized by various embodiments of the present invention.
Figure 2:
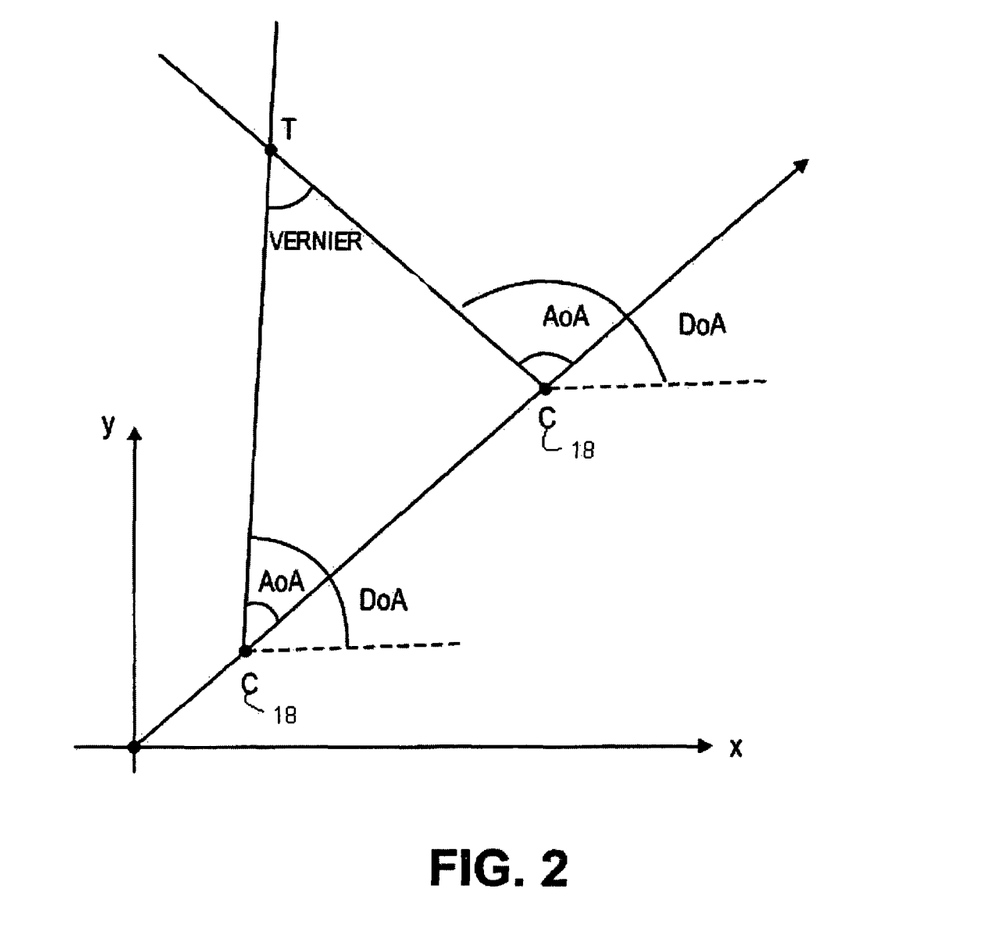
FIG. 2 is a schematic view of various angles formed between a moving collector and a signal-emitting target.

Methods consistent with the present teachings are especially well-suited for implementation by a computing element 10, as illustrated in FIG. 1. The computing element 10 may be a part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various generally conventional devices, such as microcontrollers, microprocessors, programmable logic devices, desktop computers, servers, portable computing devices, etc.

Additionally, the computing element 10 may include additional devices, such as a display for indicating processed information or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

Further, the computing element 10 preferably includes or is otherwise coupled with a plurality of ports 20 to which received signals may be assigned. "Port", as utilized herein, refers to any element or device that is operable to relay, store, retain, transmit, transfer, or output a signal. The ports 20 may include data paths, computer-readable mediums, electrical connections, network connections, signal streams, etc. In various embodiments the ports 20 include electronic audio connections that enable an operator to listen to signals assigned to each port.

The ports 20 may be integral or discrete with various components of the computing element 10. For instance, the ports 20, processor 14, and memory 16 may be included within a common housing or the ports 20 may be external the processor 14 and memory 16 and accessible through the communications network 12. Further, the ports 20 may comprise a portion of one or more of the collector elements 18, such as in embodiments where the processor 14, memory, 16, collector element 18, and ports 20 are included within a common housing.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions including one or more code segments for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain, or store the program for use by or in connection with the instruction execution system, apparatus, or device. The computer-readable medium can be, for example, but not limited to, an electronic, magnetic, optical, electro-magnetic, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), and a portable compact disc (CD) or a digital video disc (DVD).

As shown in FIG. 1, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform signal tracking and port assignment as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, unidirectional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Figure 3:
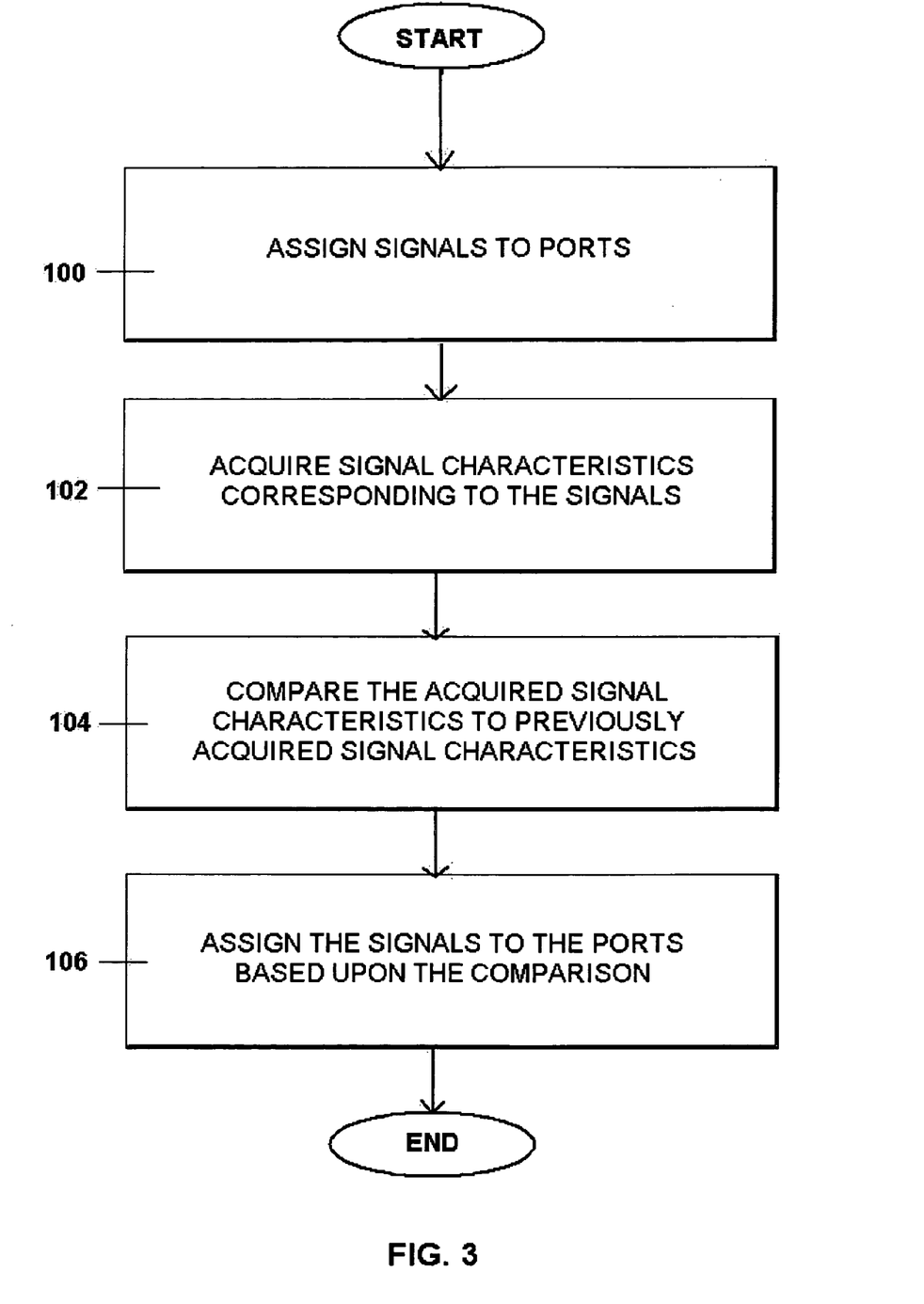
FIG. 3 is a flow chart showing some of the steps operable to be performed by the present invention.

A flowchart of steps that may be utilized by the present invention to mitigate port swapping is illustrated in FIG. 3. Some of the blocks of the flow chart may represent a code segment or other portion of code of the computer program of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

In step 100, one or more signals are assigned to the ports 20. Specifically, signals received, collected, detected, or otherwise acquired by one or more of the collector elements 18 are assigned to the ports 20 by the processor 14. Preferably, each port is assigned only one signal to facilitate use or further propagation of the received signals. For example, should the ports 20 consist of eight discrete ports, the processor 14 is operable to assign one signal to each of the eight ports.

The processor 14 may assign signals to the ports 20 utilizing various devices and functions. For instance, the processor 14 may include or be coupled with a switch that is operable to route signals to particular ports. Additionally or alternatively, the processor 14 may assign the signals to the ports 20 by writing data to the memory 16 or other computer-readable mediums, by transferring data or portions of the signals through the communications network 12, by outputting to a display or speaker various portions of the signals, and/or by routing or directing portions of the signals through or to various electrical elements. As should be appreciated by those skilled in the art, innumerable devices and methods may be employed by the present invention to route or otherwise direct received signals to the ports 20.

In various embodiments, step 100 need not include actively assigning signals to ports 20 as the signals may be previously assigned to the ports 20. Thus, the signals may be assigned to the ports 20 by other devices or methods and the present invention, and specifically the computing element 10, is operable to utilize previously generated port assignments in the following steps.

In step 102, one or more signal characteristics corresponding to the signals assigned to the ports 20 are acquired by the computing element 10. The present invention may acquire the signal characteristics utilizing various methods, devices, and elements, including utilizing one or more of the collector elements 18 to detect and/or receive the signals assigned to the ports 20 in step 100, retrieving the signal characteristics through the communications network 12 from one or more of the collector elements 18 and/or other computing elements, retrieving signal characteristics from the memory 16, calculating signal characteristics utilizing information stored within the memory 16 or received through the communications network 12, combinations thereof, etc. Thus, the present invention is not required to directly determine the acquired signal characteristics.

The acquired signal characteristics may correspond to any characteristic relating to the signals assigned to the ports, such as angle of arrival (AOA), direction of arrival (DOA), time difference of arrival (TDOA), frequency difference of arrival (FDOA), vernier angle, emitter geolocation, emitter range, combinations thereof, etc.

Preferably, the acquired signal characteristics correspond to geolocations to enable accurate assignment and comparison of signals. For instance, two discrete signals may have the same AOA due to emitter and collector position, thereby inhibiting accurate port assignment, while two discrete signals will not generally have the same geolocation.

To acquire the geolocations, the computing element 10 may compute the geolocations based upon other acquired signal characteristics, such as TDOA and FDOA, directly acquire the geolocations from other devices through the communications network 12, and/or otherwise determine the source location of emitted signals. As should be appreciated by those skilled in the art, innumerable methods exist for determining geolocations and other signal characteristics of emitted signals, each of which may be employed by the present invention.

The acquired signal characteristics may be stored within the memory 16 and/or transmitted through the communications network 12 for later use by the computing element 10 or for use by other devices. For example, the memory 16 may include a database of acquired signal characteristics, including sets of signal characteristics corresponding to various signals, to facilitate the comparison performed in step 104. However, the acquired signal characteristics need not necessarily be stored in non-volatile memory as they may be stored in RAM or on other non-permanent devices or mediums.

In various embodiments, step 102 is preferably repeatedly performed such that signal characteristics may be continuously acquired at predetermined intervals. Such repetition facilitates the comparison performed in step 104 and the assignment performed in step 106 by ensuring the existence of up-to-date signal characteristics and sets of signal characteristics. Preferably, each time step 102 is performed the acquired signal characteristic(s) are stored within the memory 16, or otherwise retained by the computing element 10, to further facilitate the comparison performed in step 104.

In step 104, the one or more signal characteristics acquired in step 102 are compared to one or more previously acquired signal characteristics. The previously acquired signal characteristics are generally similar to the characteristics acquired in step 102 with the exception that they are acquired earlier in time than the characteristics in step 102.

Each previously acquired signal characteristic and each characteristic acquired in step 102 preferably relate to one signal assigned to one of the ports 20 in step 100. Comparison of the characteristics acquired in step 102 with previously acquired characteristics enables the present invention to determine if the signals corresponding to the characteristics remain the same and thus if the signals are correctly assigned to the ports 20, as is discussed below in step 106.

In various embodiments, the previously acquired characteristics are generated through repetition of step 102 and storage of the resulting acquired characteristics and/or sets of acquired characteristics within the memory 16. Thus, the previously acquired characteristics may correspond to signal characteristics previously acquired in step 102. For example, step 102 may be performed a first time to acquire a first signal characteristics and step 102 may be performed a second time to acquire a second signal characteristic, and the second signal characteristics may be compared to the previously acquired first signal characteristic in step 104.

Preferably, each signal characteristic acquired in step 102 is compared to a plurality of previously acquired signal characteristics corresponding to the plurality of signals assigned to the ports in step 100 to facilitate the assignment of the signals to the ports 20 in step 106. Thus, step 104 may include the comparison of sets of characteristics to determine any differences or variances within the sets.

For example, should the computing element 10 include eight ports each having one signal assigned thereto, wherein a first signal characteristic is acquired for each signal in step 102 and a plurality of previously acquired second signal characteristics exist in the memory 16, each first signal characteristic may be compared to each of the plurality of previously acquired second signal characteristics to determine variances or differences between each signal characteristic.

If first and second signal characteristics corresponding to a particular signal assigned to a particular port are the same, then the processor's 14 use of the signal is correct. However, if the first and second signal characteristics corresponding to a particular signal on a particular port vary, then the characteristics are not likely corresponding to the same signal and the processor's 14 use of the signal is likely incorrect.

For instance, if the signal is emitted from a stationary source and the first and second signal characteristics initially corresponding to a signal assigned to a first port indicate different geolocations, then the first and second signal characteristics do not actually correspond to the signal. Similarly, if the signal is emitted from a stationary source and the first and second signal characteristics initially corresponding to the signal indicate different geolocations, but a third signal characteristics initially corresponding to a second signal assigned to another port is the same as the first signal characteristic, then the first and third signal characteristics actually correspond to the same (second) signal.

Step 104 may be repeated in a similar manner to step 102 to facilitate the assignment performed in step 106 by ensuring the existence of up-to-date signal characteristics and comparisons. Preferably, step 104 is performed each time step 102 is performed. However, step 104 may be performed at intervals less than step 102.

In various embodiments, the characteristics may be compared utilizing a predetermined amount. For instance, as signal characteristics may vary due to measurement error and other static and dynamic variances, the comparison may be compared utilizing the predetermined amount, such as an error value corresponding to the utilized collector elements 18. Utilization of the predetermined amount enables characteristics to be determined to be the same and/or matched even if they vary by some amount less than the predetermined amount. The predetermined amount may be calculated by the processor 14, retrieved from the memory 16, accessed through the communications network 12, provided by a user, etc.

The results of the comparison may be retained by the computing element 10, such as by storing the results in the memory 16 or by transmitting the results through the communications network 12, to facilitate the assignment provided in step 106. Further, step 104 may be performed generally simultaneously with other steps, such as steps 102 and 106, and/or step 104 may be performed separate from other steps.

In step 106, the signals are assigned to the ports 20 based upon the comparison performed in step 104. Specifically, the signals are assigned to the ports 20 to mitigate port swapping by ensuring that signals are consistently assigned to the ports 20 based upon the comparison provided in step 104.

For instance, if a first signal is assigned to a first port and a second signal is assigned to a second port in step 100, the signal characteristics acquired in step 102 and compared in step 104 are utilized to ensure that both signals remain assigned to appropriate ports. Such consistent assignment of signals to ports mitigates port swapping and facilitates efficient communication and transfer of signals.

More specifically, if a first signal is assigned to a first port in step 100 and has a first signal characteristic initially associated therewith, and the comparison performed in step 104 indicates that the first signal characteristic varies from a previously determined second signal characteristic corresponding to the first signal, then the first signal may be assigned to a second port as the assignment of the first signal to the first port is no longer correct. Similarly, if the comparison of step 104 indicates that a second signal initially assigned to the second port has a third signal characteristic that is the same as the second signal characteristic, the second signal may be assigned to the first port, thereby mitigating port swapping of the first and second signals. As should be appreciated, any number of signals and signal characteristics may be compared in this manner.

Thus, signals having characteristics that exceed a minimum variance between acquired and previously acquired signal characteristics are assigned to ports different than those initially assigned in step 100 and signals having characteristics that correspond to minimum variances between acquired and previously acquired signal characteristics are retained on the same ports as initially assigned in step 100. Signals may therefore be assigned to correct ports 20 by matching a signal characteristic corresponding to each signal with a previously acquired signal characteristic and then assigning each signal to the port associated with the previously acquired signal characteristic.

Step 106 is preferably performed at regular intervals to ensure the continuously correct assignment of signals to the ports 20. For instance, in embodiments where communication signals are assigned to the ports 20, step 106 is preferably performed at an interval that prevents significant lapses in communication, such as at an interval of a every ½ second, second, two seconds, etc. As should be appreciated by those skilled in the art, step 106 may be performed only once or at any interval depending on various system characteristics.

Further, step 106 may be performed generally concurrently or simultaneously with steps 102 and 104. Preferably, step 106 is performed each time steps 102 and 104 are performed to ensure the utilization of accurate signal characteristics and comparisons. However, as discussed above, step 106 may be performed at any interval.

Step 106 is operable to utilize the same devices and methods as step 100 to assign signals to the ports 20. Thus, signals may be assigned to appropriate ports in step 106 by utilizing a switch, writing data to a computer-readable memory, outputting portions of the signals, etc.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A method of mitigating port swapping during signal tracking, the method comprising:
  assigning a received wireless signal to a first port of a computing element;
  repeatedly acquiring signal characteristics of the signal and storing the acquired signal characteristics in a memory component;
  comparing a first one of the signal characteristics stored in the memory component to a second one of the signal characteristics stored in the memory component, the second one of the signal characteristics being acquired earlier in time than the first one of the signal characteristics;
  if the first and second signal characteristics vary, assigning the signal to a second port; and
  comparing a third one of the signal characteristics stored in the memory component to the first one of the signal characteristics stored in the memory component, the third one of the signal characteristics being acquired at a different time than the first one and the second one of the signal characteristics, and if the third and first signal characteristics vary, assigning the signal to the second port,
  wherein the signal is not present on the first port unless the signal has been assigned to the first port, the signal is not present on the second port unless the signal has been assigned to the second port, wherein the first signal characteristic is selected from the group consisting of a geolocation, an angle of arrival, a direction of arrival, a time difference of arrival, a frequency difference of arrival, and combinations thereof.

2. The method of claim 1, wherein the signal is assigned to the second port if the first and second signal characteristics vary by a predetermined amount.

3. The method of claim 1, further including—
  acquiring a first set of signal characteristics corresponding to a plurality of signals assigned to a plurality of ports,
  comparing the first set to a second set of previously acquired signal characteristics, and assigning signals to the ports based on variances between the signals within the first set and the signals within the second set.

4. The method of claim 3, wherein signals having characteristics that exceed a minimum variance between acquired and previously acquired signal characteristics are assigned to different ports and signals having characteristics that correspond to minimum variances between acquired and previously acquired signal characteristics are retained on the same ports.

5. The method of claim 1, wherein the signal corresponds to an audio signal and the ports correspond to audio ports.

6. A computing element operable to mitigate port swapping during signal tracking, the computing element comprising:
   a first port;
   a second port;
   a memory; and
   a processor coupled with the memory and the ports, the processor operable to—
      repeatedly acquire signal characteristics corresponding to the signal assigned to the first port and store the signal characteristics in the memory,
      compare a first one of the signal characteristics stored in the memory to a second one of the signal characteristics stored in the memory, the second one of the signal characteristics being acquired earlier in time than the first one of the signal characteristics,
      if the first and second signal characteristics vary, assign the signal to the second port,
      compare acquire a third one of the signal characteristics stored in the memory to the first one of the signal characteristics stored in the memory, the third one of the signal characteristics being acquired at a different time than the first one and the second one of the signal characteristics,
      and
      if the third and first signal characteristics vary, assign the signal to the second port,
   wherein the signal is not present on the first port unless the signal has been assigned to the first port, and the signal is not present on the second port unless the signal has been assigned to the second port, wherein the first signal characteristic is selected from the group consisting of a geolocation, an angle of arrival, a direction of arrival, a time difference of arrival, a frequency difference of arrival, and combinations thereof.

7. The computing element of claim 6, wherein the processor is operable to be coupled with a collector element to acquire at least one of the signal characteristics.

8. The computing element of claim 6, wherein the processor assigns the signal to the second port if the first signal and second signal characteristics vary by a predetermined amount.

9. The computing element of claim 6, wherein the signal corresponds to an audio signal and the ports correspond to audio ports.

10. A non-transitory computer-readable medium having stored thereon a computer program for mitigating port swapping during signal tracking, the computer-readable medium comprising:
    a code segment operable to be executed by the computing element to repeatedly acquire signal characteristics corresponding to a signal assigned to a first port and to store the signal characteristics in a memory;
    a code segment operable to be executed by the computing element to compare a first one of the signal characteristics stored in the memory to a second one of the signal characteristics stored in the memory, the second one of the signal characteristics being acquired earlier in time than the first one of the signal characteristics;
    a code segment operable to be executed by the computing element to assign the signal to a second port if the first and second signal characteristics vary;
    a code segment operable to be executed by the computing element to compare a third one of the signal characteristics stored in the memory to the first one of the signal characteristics stored in the memory, the third one of the signal characteristics being acquired at a different time than the first one and the second one of the signal characteristics; and
    a code segment operable to be executed by the computing element to assign the signal to the second port if the third and first signal characteristics vary,
    wherein the signal is not present on the first port unless the signal has been assigned to the first port, and the signal is not present on the second port unless the signal has been assigned to the second port, wherein the first signal characteristic is selected from the group consisting of a geolocation, an angle of arrival, a direction of arrival, a time difference of arrival, a frequency difference of arrival, and combinations thereof.

11. The non-transitory computer-readable medium of claim 10, wherein the code segment assigns the signal to the second port if the first and second signal characteristics vary by a predetermined amount.

12. The non-transitory computer-readable medium of claim 10, further comprising—
    a code segment operable to be executed by the computing element to acquire a first set of signal characteristics corresponding to a plurality of signals assigned to a plurality of ports,
    a code segment operable to be executed by the computing element to compare the first set to a second set of previously acquired signal characteristics, and
    a code segment operable to be executed by the computing element to assign signals to the ports based on variances between the signals within the first set and the signals within the second set.

13. The non-transitory computer-readable medium of claim 10, wherein the signal corresponds to an audio signal and the ports correspond to audio ports.

14. A computing element operable to mitigate port swapping during signal tracking, the computing element comprising:
    a first port;
    a second port;
    a memory operable to store a second signal characteristic corresponding to a first signal assigned to the first port and a third signal characteristic corresponding to a second signal assigned to the second port; and
    a processor coupled with the memory and the ports, the processor operable to—
       acquire a first signal characteristic corresponding to the first signal,
       compare the first and second signal characteristics,
       if the first and second signal characteristics vary, assign the first signal to the second port,
       acquire a fourth signal characteristic corresponding to the second signal,
       compare the fourth signal characteristic to the second and third signal characteristics, and
       if the fourth signal characteristic varies from the third signal characteristic more than the second signal characteristic, assign the second signal to the first port and assign the first signal to the second port, wherein the signal is not present on the first port unless the signal has been assigned to the first port, the signal is not present on the second port unless the signal has been assigned to the second port, the second signal is not present on the first port unless the second signal has been assigned to the first port, the second signal is not present on the second port unless the second signal has been assigned to the second port, wherein the first signal characteristic is selected from the group consisting of a geolocation, an angle of arrival, a direction of arrival, a time difference of arrival, a frequency difference of arrival, and combinations thereof.

15. The method of claim 1, wherein the first port corresponds to a channel of a first network connection and the second port corresponds to a channel of a second network connection.

16. The computing element of claim 6, wherein the first port corresponds to a channel of a first network connection and the second port corresponds to a channel of a second network connection.

17. The computer-readable medium of claim 10, wherein the first port corresponds to a channel of a first network connection and the second port corresponds to a channel of a second network connection.

18. The computing element of claim 14, wherein the first port corresponds to a channel of a first network connection and the second port corresponds to a channel of a second network connection.

19. A computing element operable to mitigate port swapping during signal tracking, the computing element comprising:

a first port comprising a channel of a first network connection;

a second port comprising a channel of a second network connection;

a memory; and a processor coupled with the memory and the ports, the processor operable to— repeatedly acquire the signal characteristics corresponding to the signal and store the signal characteristics in the memory, compare a first one of the signal characteristics stored in the memory and second one of the signal characteristics stored in the memory, the second one of the signal characteristics being acquired earlier in time than the first one of the signal characteristics, if the first and second signal characteristics vary, assign the signal to the second port, compare a third one of the signal characteristics stored in the memory to the first one of the signal characteristics stored in the memory, the third one of the signal characteristics being acquired at a different time than the first one and the second one of the signal characteristics, compare the third signal characteristic to the first signal characteristic, and if the third and first signal characteristics vary, assign the signal to the second port, wherein the signal is not present on the first port unless the signal has been assigned to the first port, and the signal is not present on the second port unless the signal has been assigned to the second port, wherein the first signal characteristic is selected from the group consisting of a geolocation, an angle of arrival, a direction of arrival, a time difference of arrival, a frequency difference of arrival, and combinations thereof.

\* \* \* \* \*